(12) United States Patent
Kilaru et al.

(10) Patent No.: US 10,823,125 B1
(45) Date of Patent: Nov. 3, 2020

(54) SYSTEMS AND METHODS FOR DETERMINING FUEL LEVEL BASED ON FUEL CONSUMPTION AND REFILL DATA

(71) Applicant: TOYOTA CONNECTED NORTH AMERICA, INC., Plano, TX (US)

(72) Inventors: Raja Shekar Kilaru, Frisco, TX (US); Karthik Kaja, Plano, TX (US); Marshall Sosland, Plano, TX (US); Randall Mason Harris, Plano, TX (US)

(73) Assignee: TOYOTA CONNECTED NORTH AMERICA, INC., Plano, TX (US)

( * ) Notice: Subject to any disclaimer, the term of this patent is extended or adjusted under 35 U.S.C. 154(b) by 0 days.

(21) Appl. No.: 16/673,356

(22) Filed: Nov. 4, 2019

Related U.S. Application Data

(60) Provisional application No. 62/840,806, filed on Apr. 30, 2019.

(51) Int. Cl.
*F02M 37/00* (2006.01)
*B60K 15/03* (2006.01)

(52) U.S. Cl.
CPC ......... *F02M 37/0082* (2013.01); *B60K 15/03* (2013.01); *B60K 2015/03217* (2013.01)

(58) Field of Classification Search
CPC ............................ F02M 37/0082; B60K 15/03
USPC ....................................................... 340/438
See application file for complete search history.

(56) References Cited

U.S. PATENT DOCUMENTS

| 8,260,534 B2* | 9/2012 | Henderson ............. G01C 22/00 701/123 |
| 9,880,013 B2* | 1/2018 | Nobrega ............ G01C 21/3676 |
| 2012/0209579 A1* | 8/2012 | Fansler .................. G06Q 10/04 703/8 |

(Continued)

FOREIGN PATENT DOCUMENTS

| CN | 103612598 A | 3/2014 |
| CN | 105184893 A | 12/2015 |

(Continued)

OTHER PUBLICATIONS

Cho, Wanlee et al., "DTG big data analysis for fuel consumption estimation," http://jips-k.org/file/down?pn=448; Published Apr. 2017.

*Primary Examiner* — Kerri L McNally
(74) *Attorney, Agent, or Firm* — Dinsmore & Shohl LLP

(57) ABSTRACT

Embodiments include systems and methods of reporting the fuel level in a fuel tank of a vehicle. The method includes receiving a fuel consumption curve and a fuel refill curve, receiving a first fuel level value and a second fuel level value from a fuel level sensor, and determining whether the vehicle is consuming fuel or receiving fuel based on a change between the first fuel level value and the second fuel level value. In response to determining that the vehicle is consuming fuel, the method further includes determining a fuel gauge display value based on the second fuel level value and the fuel consumption curve. In response to determining that the vehicle is receiving fuel, the method further includes determining a fuel gauge display value based on the second fuel level value and the fuel refill curve. The fuel gauge display value is presented on a fuel gauge display.

20 Claims, 8 Drawing Sheets

(56) References Cited

U.S. PATENT DOCUMENTS

| | | | | |
|---|---|---|---|---|
| 2012/0265429 A1* | 10/2012 | Perera | ................ | F02M 37/0082 |
| | | | | 701/123 |
| 2013/0255642 A1* | 10/2013 | Ikeya | ................ | F02M 37/0094 |
| | | | | 123/494 |
| 2016/0103009 A1* | 4/2016 | Milton | ................... | G01F 22/00 |
| | | | | 73/313 |
| 2017/0200361 A1* | 7/2017 | McBride | ............. | G01F 25/0061 |
| 2017/0356408 A1* | 12/2017 | Yang | ................ | F02M 37/0076 |
| 2018/0299313 A1* | 10/2018 | Rovik | ...................... | G07C 5/08 |
| 2019/0120191 A1* | 4/2019 | Tani | ................... | F02M 63/0205 |

FOREIGN PATENT DOCUMENTS

| | | | |
|---|---|---|---|
| JP | 5668030 | A | 2/2014 |
| KR | 101593607 | A | 2/2016 |

\* cited by examiner

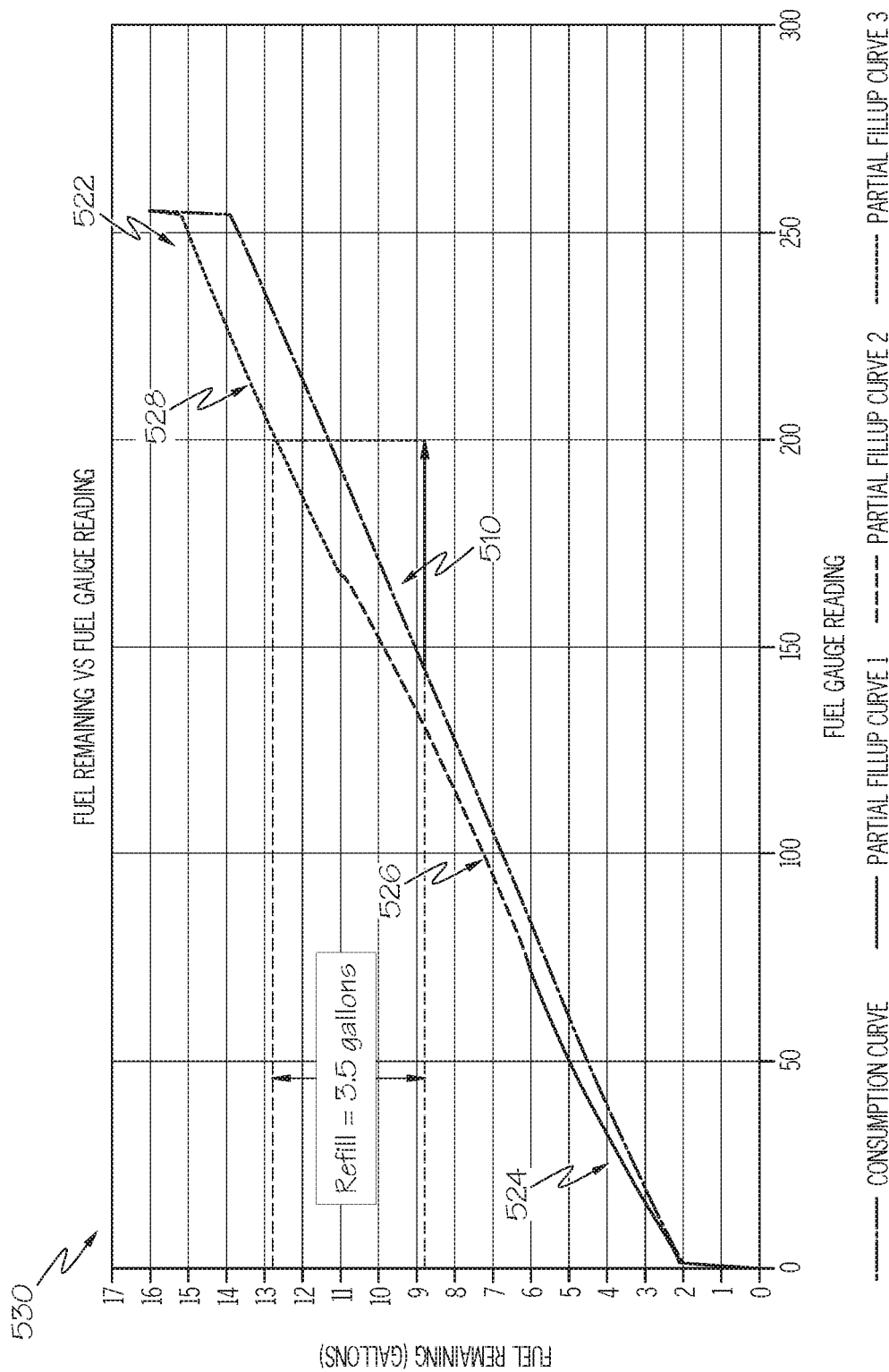

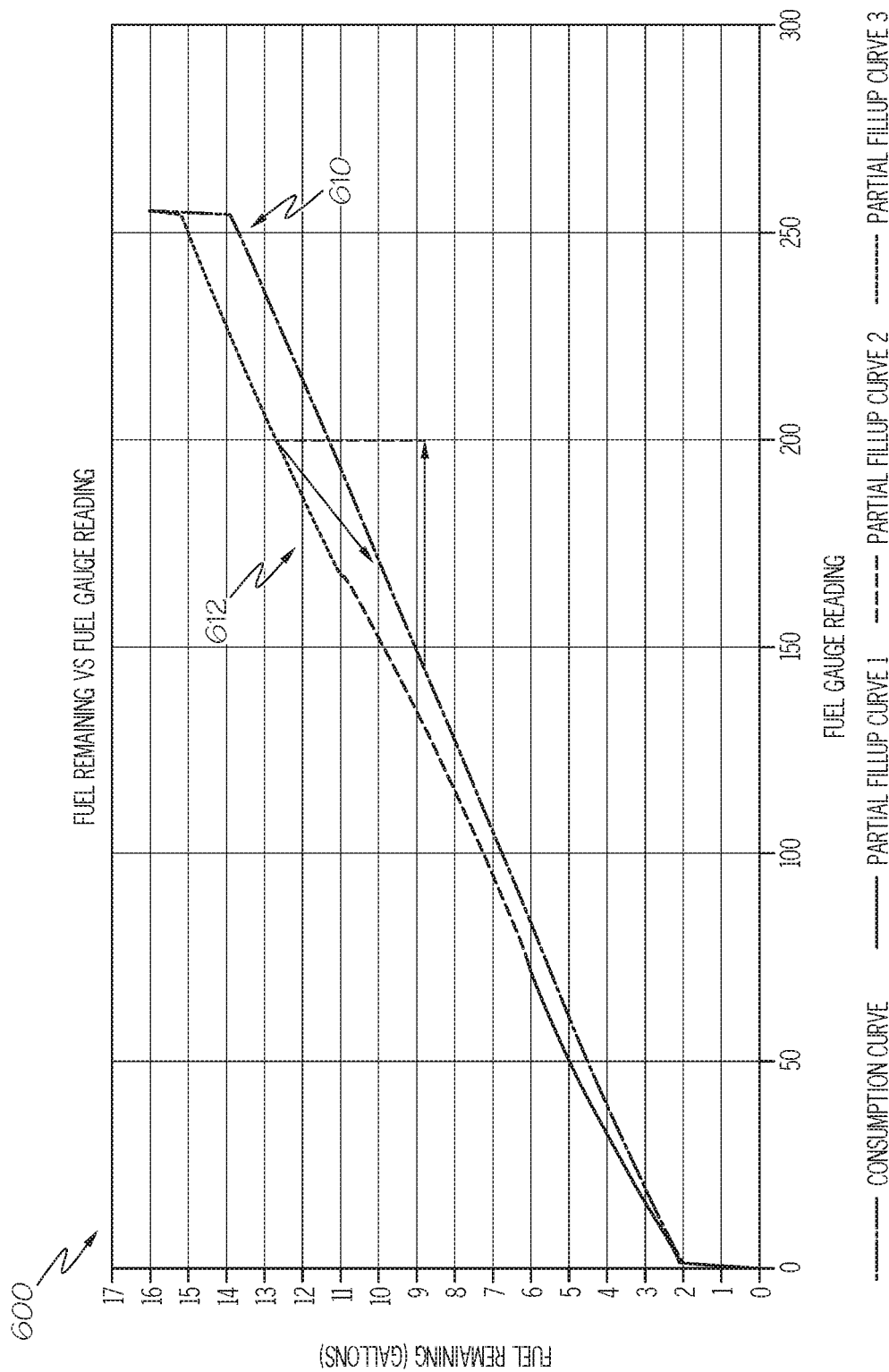

SYSTEMS AND METHODS FOR DETERMINING FUEL LEVEL BASED ON FUEL CONSUMPTION AND REFILL DATA

CROSS-REFERENCE TO RELATED APPLICATION

This application claims priority to U.S. Provisional Patent Application No. 62/840,806 filed Apr. 30, 2019, the contents of which are incorporated herein by reference in its entirety.

TECHNICAL FIELD

The present specification generally relates to systems and methods for improving the accuracy in reporting the fuel level in a fuel tank. More specifically, the present disclosure relates to systems and methods for improving the accuracy in reporting a remaining fuel level on a fuel gauge display.

BACKGROUND

It has been determined that controller area network ("CAN") data values conventionally used to determine vehicle fuel level do not consistently linearly map to the amount of fuel actually remaining in a fuel tank under some circumstances, particularly after partial refill events (e.g., when fuel is added to the fuel tank, but the full tank is not completely filled). This inaccuracy can lead to undesired and incorrect reported fuel level values. Accordingly, a need exists for systems and methods for improving the accuracy in reporting the fuel level in a fuel tank.

SUMMARY

In some embodiments, a method of reporting a fuel level in a fuel tank of a vehicle is disclosed. The method includes receiving, at an electronic control unit, a fuel consumption curve and a fuel refill curve; receiving, at the electronic control unit, a first fuel level value from a fuel level sensor; receiving, at the electronic control unit, a second fuel level value from the fuel level sensor; and determining whether the vehicle is consuming fuel or receiving fuel based on a change between the first fuel level value and the second fuel level value. The method further includes, in response to determining that the vehicle is consuming fuel, determining a fuel gauge display value for an amount of fuel in a fuel tank based on the second fuel level value and the fuel consumption curve. The method further includes, in response to determining that the vehicle is receiving fuel, determining the fuel gauge display value for the amount of fuel in the fuel tank based on the second fuel level value and the fuel refill curve. The method further includes presenting the fuel gauge display value on a fuel gauge display.

In some embodiments, a system of reporting a fuel level in a fuel tank of a vehicle includes a fuel gauge display, a fuel level sensor, and an electronic control unit communicatively coupled to the fuel gauge display and the fuel level sensor. The electronic control unit is configured to: receive a fuel consumption curve and a fuel refill curve, receive a first fuel level value from the fuel level sensor, receive a second fuel level value from the fuel level sensor, and determine whether the vehicle is consuming fuel or receiving fuel based on a change between the first fuel level value and the second fuel level value. The electronic control unit is further configured to, in response to determining that the vehicle is consuming fuel, determine a fuel gauge display value for an amount of fuel in a fuel tank based on the second fuel level value and the fuel consumption curve. The electronic control unit is further configured, to in response to determining that the vehicle is receiving fuel, determine the fuel gauge display value for the amount of fuel in the fuel tank based on the second fuel level value and the fuel refill curve. The electronic control unit is further configured to present the fuel gauge display value on the fuel gauge display.

In some embodiments, a vehicle includes a fuel gauge display, a fuel level sensor, and an electronic control unit communicatively coupled to the fuel gauge display and the fuel level sensor. The electronic control unit is configured to receive a fuel consumption curve and a fuel refill curve, receive a first fuel level value from the fuel level sensor, receive a second fuel level value from the fuel level sensor, and determine whether the vehicle is consuming fuel or receiving fuel based on a change between the first fuel level value and the second fuel level value. The electronic control unit is further configured to in response to determining that the vehicle is consuming fuel, determine a fuel gauge display value for an amount of fuel in a fuel tank based on the second fuel level value and the fuel consumption curve. The electronic control unit is further configured to, in response to determining that the vehicle is receiving fuel, determine the fuel gauge display value for the amount of fuel in the fuel tank based on the second fuel level value and the fuel refill curve. The electronic control unit is further configured to present the fuel gauge display value on the fuel gauge display.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 5C depicts an example plot of a fuel refill curve being used to determine a fuel refill amount according to one or more embodiments shown and described herein; and FIG. 6 depicts an illustrative plot of a fuel consumption curve and a fuel refill curve including three partial refill curves according to one or more embodiments shown and described herein.

DETAILED DESCRIPTION

Figure 1:
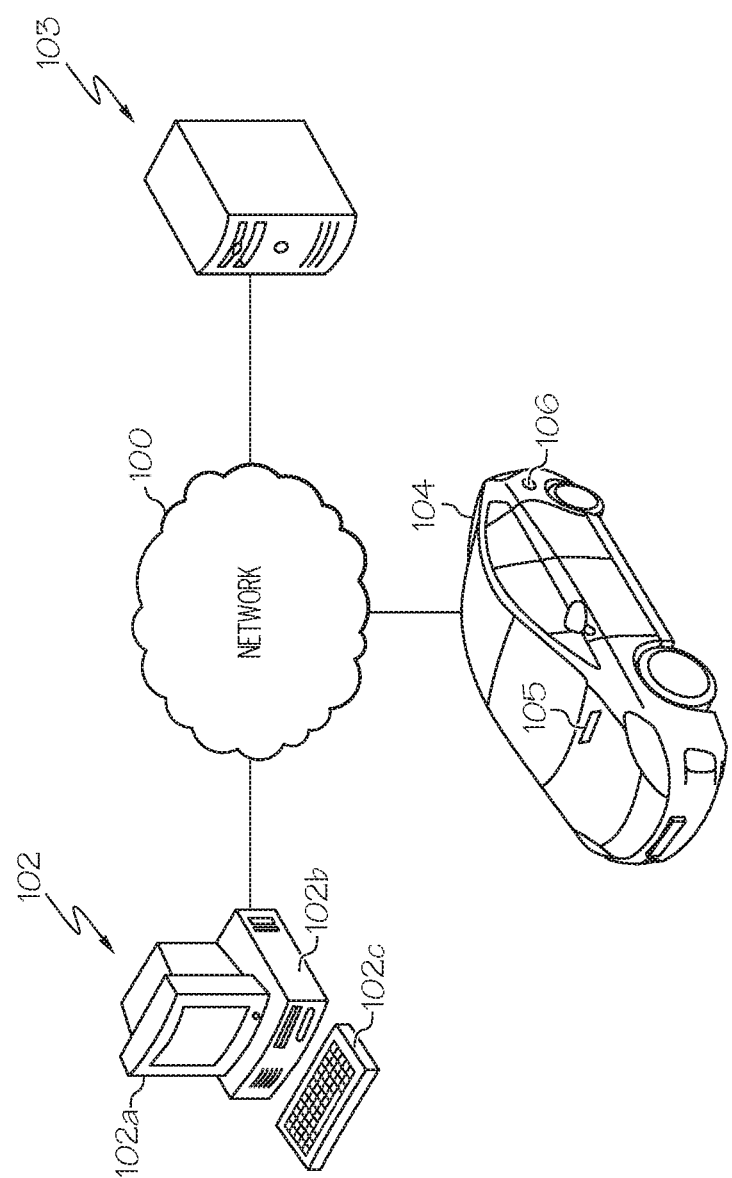
FIG. 1 depicts an illustrative system for reporting a fuel level in a fuel tank of a vehicle according to one or more embodiments shown and described herein.

Embodiments of the present disclosure include systems and methods that provide improved accuracy in reporting a fuel level of a vehicle by determining the fuel level based on fuel consumption and fuel refill curves. The present disclosure describes the implementation and utilization of fuel consumption and fuel refill curves to more accurately map the fuel level obtained from controller area network ("CAN") data values to a fuel level in a fuel tank. The fuel gauge CAN sensor provides values from 0-255 that, when fit to a linear fuel consumption curve where 255 corresponds to a full tank and 0 corresponds to an empty tank, provide inaccurate results during fuel consumption and partial refill events. In order to solve this problem, it was discovered through statistical analysis of historical fuel consumption data (e.g., generated from the CAN in milliliters with a frequency of 5 Hz) and fuel consumption values for various gauge readings at various states of fuel level that a characterization curve may be implemented to improve fuel level indicator values presented for a vehicle. For example, using historical and controlled simulation data, a consumption curve was able to be constructed that determines the amount of fuel remaining at any given point of time. Additionally, it was also discovered that when partial fuel refill events occurred, the actual fuel level remaining after the refill event could not be accurately determined from this consumption curve in some instances, indicating that the refill behavior is not the same as the consumption behavior in some instances. However, by analyzing data points generated from drain and refill tests, a refill curve may be generated for a vehicle that accurately determines the fuel level after a partial refill with the initial level being determined by the consumption curve. During the analysis of a fuel level for a vehicle, a weighted average technique on these two curves was used to extrapolate the fuel level after the partial refill until the values converge to values consistent with the consumption curve. In some embodiments, the accuracy of the system and method for determining a fuel level of a vehicle may be within +/−0.3 gallons, an improvement of the accuracy available in current systems.

It is contemplated that the implementation of systems and methods described herein may deliver more reliable and more accurate fuel level tracking and reporting of fuel level values, and allow rental car and/or fleet management solutions to more accurately track fuel usage, thus generating additional revenue and reducing time and resources associated with monitoring and reporting fuel consumption and invoicing of the same. The more accurate fuel readings will also help assure that customers are not undercharged or overcharged for fuel. Furthermore, other advantages may extend to the ability to better understand and share fuel consumption and refill behavior with third parties, such as other rental car, fleet management, insurance, or car manufactures through connected technology.

The following will now describe these systems and methods in more detail with reference to the drawings and where like numbers refer to like structures.

Figure 2:
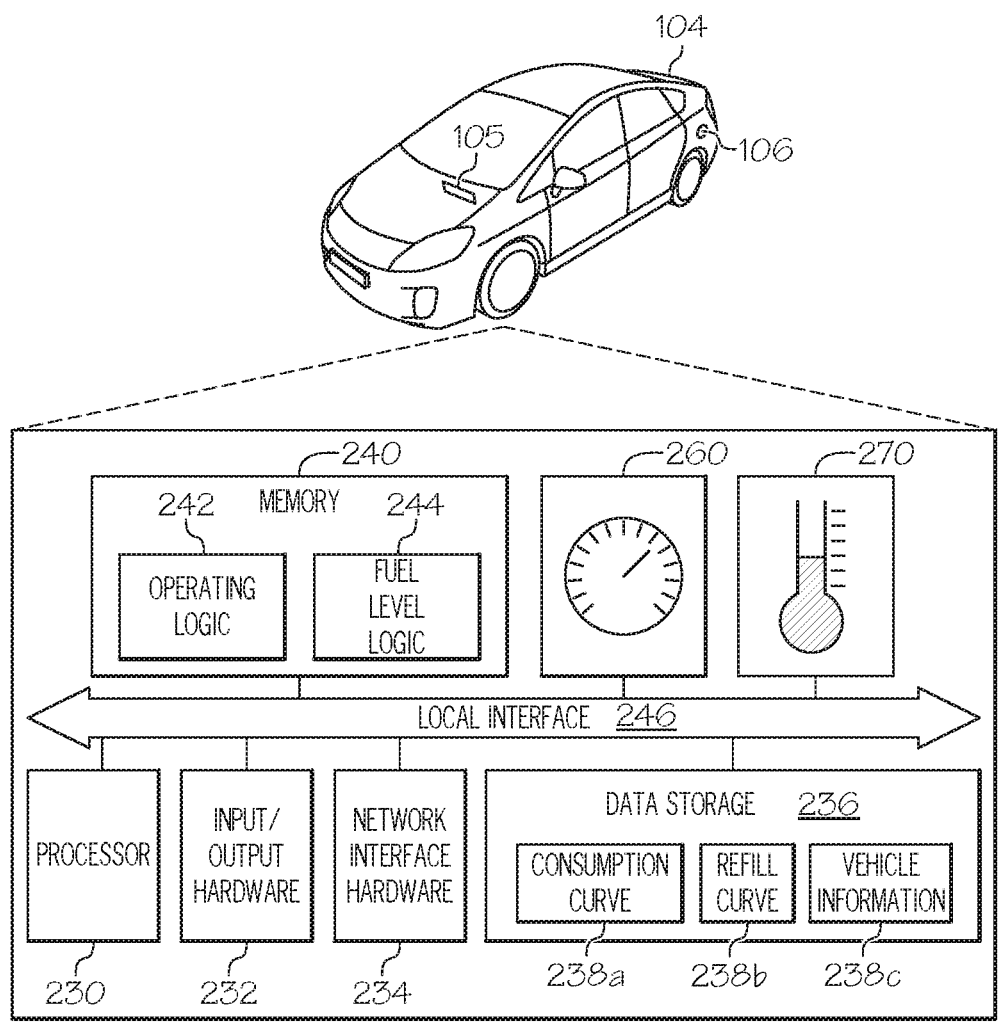
FIG. 2 depicts an illustrative vehicle implementing the system for reporting the fuel level in the fuel tank of the vehicle according to one or more embodiments shown and described herein.

Referring to FIGS. 1 and 2, an illustrative system and vehicle 104 configured to report a fuel level in a fuel tank of the vehicle 104 are depicted. In particular, FIG. 1 depicts one example system implemented over a network of devices to provide accurate reporting of a fuel level in a fuel tank of a vehicle 104. The system of FIG. 1 may be implemented over a network 100. The network 100 may include a wide area network, such as the internet, a local area network (LAN), a mobile communications network, a public service telephone network (PSTN) and/or other network. The network 100 may be configured to electronically and/or communicatively connect a user computing device 102, one or more servers 103 optionally storing one or more fuel consumption curves, fuel refill curves, vehicle information and/or the like, and a vehicle 104. Each of the components, the user computing device 102, the one or more servers 103, and the vehicle 104 may be communicatively coupled together via the network 100. As referred to herein "remote computing device" refers to either or both the user computing device 102, the one or more servers 103.

The user computing device 102 may include a display 102a, a processing unit 102b and an input device 102c, each of which may be communicatively coupled together and/or to the network 100. The user computing device 102 may be a server, a personal computer, a laptop, a tablet, a smartphone, an application specification handheld device, or the like. The user computing device 102 may be used by a user of the system to provide information to the system. For example, a user may utilize the user computing device 102 to generate and/or update one or more of the fuel consumption curves, the fuel refill curves, and/or vehicle information and their association with each other. The system may also include one or more servers 103 having one or more of the fuel consumption curves, the fuel refill curves, and/or vehicle information, from which information may be queried, extracted, updated, and/or utilized by the user computing device 102 and/or the vehicle 104.

Additionally, the system includes a vehicle 104. The vehicle 104 may be an automobile, a watercraft, an airplane, a motor bike, a motor scooter, or the like. The vehicle 104 may include an electronic control unit 105, a fuel tank 106, a fuel gauge display 260 (FIG. 2), a fuel level sensor 270 (FIG. 2), and other components as will be described in more detail with respect to FIG. 2. The vehicle 104 may implement one or more of the systems and methods described herein to determine a fuel level in the fuel tank 106 of a vehicle 104. The electronic control unit 105, which is described in more detail herein, may be configured to host applications and execute processes related to the system described herein. It should be understood that while a user computing device 102 and one or more servers 103 are depicted in the illustrative system of FIG. 1, each of the functions and operations performed by the user computing device 102 and one or more servers 103 may be embodied and performed by the vehicle 104.

It is also understood that while the user computing device 102 is depicted as a personal computer, the one or more servers 103 is depicted as a server, the vehicle 104 is depicted as an automobile, these are merely examples. More specifically, in some embodiments, any type of computing device (e.g., mobile computing device, personal computer, server, and the like) may be utilized for any of these components. Additionally, while each of these computing devices is illustrated in FIG. 1 as a single piece of hardware, this is also an example. More specifically, each of the user computing device 102, the one or more servers 103, and the electronic control unit 105 of the vehicle 104 may represent a plurality of computers, servers, databases, and the like. For example, each of the user computing device 102, the one or more servers 103, and the electronic control unit 105 of the vehicle 104 may form a distributed or grid-computing framework for implementing the methods described herein.

Turning to FIG. 2, as illustrated, the vehicle 104 may include an electronic control unit 105 having a processor 230, input/output hardware 232, network interface hardware 234, a data storage component 236, a memory component 240, a fuel gauge display 260, and a fuel level sensor 270. The data storage component 236 may store a fuel consumption curve 238a, a fuel refill curve 238b that corresponds to the make and model of the vehicle 104, and vehicle information 238c. Each of these will be described in more detail herein.

The system includes the fuel refill curve 238b (e.g., a curve that correlates fuel level CAN values before and after a partial refill event with measured fuel amounts in the fuel tank before and after the partial refill event) and the fuel consumption curve 238a (e.g., a curve that correlates fuel level CAN values with measured fuel consumption during fuel consumption events). The fuel refill curve(s) and the fuel consumption curve(s) may be stored as formulas or data values in the data storage component 236 communicatively coupled to the electronic control unit 105. Such fuel refill curves and fuel consumption curves may be generated based on historical data gathered from a vehicle 104, or many vehicles (e.g., vehicles of the same make, model, year, and configuration) over time. The system determines a fuel level by mapping the fuel level sensor values from the CAN to the fuel refill curve and/or the fuel consumption curve depending on context.

In particular, the electronic control unit 105 in the vehicle 104 may determine whether the vehicle 104 has consumed fuel or has received fuel. The computing device may determine this by monitoring the change in one or more fuel level sensor values (e.g., 0-255) reported over the CAN over a period of time. When the computing device determines that the vehicle 104 has consumed fuel (e.g., by determining that the fuel level sensor value has decreased), the computing device determines a fuel level for display on a fuel gauge by mapping a CAN fuel level sensor value (e.g., a 0-255 value) to the fuel level for display using the predetermined fuel consumption curve 238a for the vehicle 104. When the electronic control unit 105 determines that the vehicle 104 has received fuel (e.g., by determining that the fuel level sensor value has increased), the electronic control unit 105 determines a fuel level for display on a fuel gauge by mapping a CAN fuel level sensor value (e.g., a 0-255 value) to the fuel level for display using the predetermined fuel refill curve 238b for the vehicle 104. In some embodiments, after the fuel level for display is determined using the fuel refill curve 238b, a smoothing function may be utilized to transition the fuel level for display from being determined based on the fuel refill curve 238b to being determined based on the fuel consumption curve 238a. The electronic control unit 105 may further present the fuel gauge display value on a fuel gauge display.

Still referring to FIG. 2, the memory component 240 may be machine readable memory (which may also be referred to as a non-transitory processor readable memory). The memory component 240 may be configured as volatile and/or nonvolatile memory and, as such, may include random access memory (including SRAM, DRAM, and/or other types of random access memory), flash memory, registers, compact discs (CD), digital versatile discs (DVD), and/or other types of storage components. Additionally, the memory component 240 may be configured to store operating logic 242 and fuel level logic 244 implementing one or more of the methods described herein for determining and reporting the fuel level in the fuel tank 106 of the vehicle 104 (each of which may be embodied as a computer program, firmware, or hardware, as an example). A local interface 246 is also included in FIG. 2 and may be implemented as controller area network ("CAN"), a bus, or other interface to facilitate communication among the components of the vehicle 104.

The processor 230 may include any processing component(s) configured to receive and execute programming instructions (such as from the data storage component 236 and/or the memory component 240). The instructions may be in the form of a machine readable instruction set stored in the data storage component 236 and/or the memory component 240. The input/output hardware 232 may include a monitor, keyboard, mouse, printer, camera, microphone, speaker, and/or other device for receiving, sending, and/or presenting data. The network interface hardware 234 may include any wired or wireless networking hardware, such as a modem, LAN port, Wi-Fi card, WiMax card, mobile communications hardware, and/or other hardware for communicating with other networks and/or devices.

It should be understood that the data storage component 236 may reside local to and/or remote from the vehicle 104 and may be configured to store one or more pieces of data for access by the electronic control unit 105 and/or other components. As illustrated in FIG. 2, the data storage component 236 may store the fuel consumption curve 238a and the fuel refill curve 238b that corresponds to the make and model of the vehicle 104 as well as vehicle information 238c. The fuel consumption curve 238a may include a dataset of characterized and correlated fuel level values obtainable from a fuel level sensor and further associated with amounts of fuel, for example gallons of gasoline in a fuel tank 106. The fuel refill curve 238b may include one or more datasets of partial and/or full refill characterized and correlated fuel level values obtainable from a fuel level sensor and further associated with amounts of fuel, for example gallons of gasoline in a fuel tank 106. The vehicle information 238c is a dataset that may define the vehicle 104 make, vehicle model, vehicle year, vehicle trim package, and/or the vehicle identification number. The vehicle information 238c may be utilized for obtaining updates to the fuel consumption curve 238a and/or the fuel refill curve 238b.

The vehicle 104 may also include a fuel gauge display 260 and a fuel level sensor 270. The fuel gauge display 260 may be any display device capable of visually depicting a fuel level value. For example, the display device may be an LED display, an analog display, a needle indicator, or the like. The fuel level sensor 270 may be any device capable of measuring and quantifying a level of fuel in a fuel tank. In some embodiments, the fuel level sensor may be a liquid level sensor, float sensor or the like.

Accordingly, it should be understood that embodiments include a system configured to receive fuel level sensor values (e.g., 0-255) from the CAN and/or fuel consumption data (e.g., in milliliters) from the CAN at a predefined frequency (e.g., 5 Hz). The system may include an electronic control unit 105, optionally having a processor 230 and memory component 240 configured to perform operations described herein. The system may further include the fuel level sensor 270 for detecting the amount of fuel in a fuel tank, a fuel flow sensor for determining the amount of consumed or received fuel, and one or more display devices (e.g., the fuel gauge display 260) for displaying a fuel level to a user. In some embodiments, the system may be connected to a network (e.g., the network 100 of FIG. 1) where one or more remote computing devices (e.g., the one or more user computing devices 102 and/or the one or more servers 103 of FIG. 1) may interconnect with the system to receive, monitor, or update a fuel level reading.

Figure 3A:
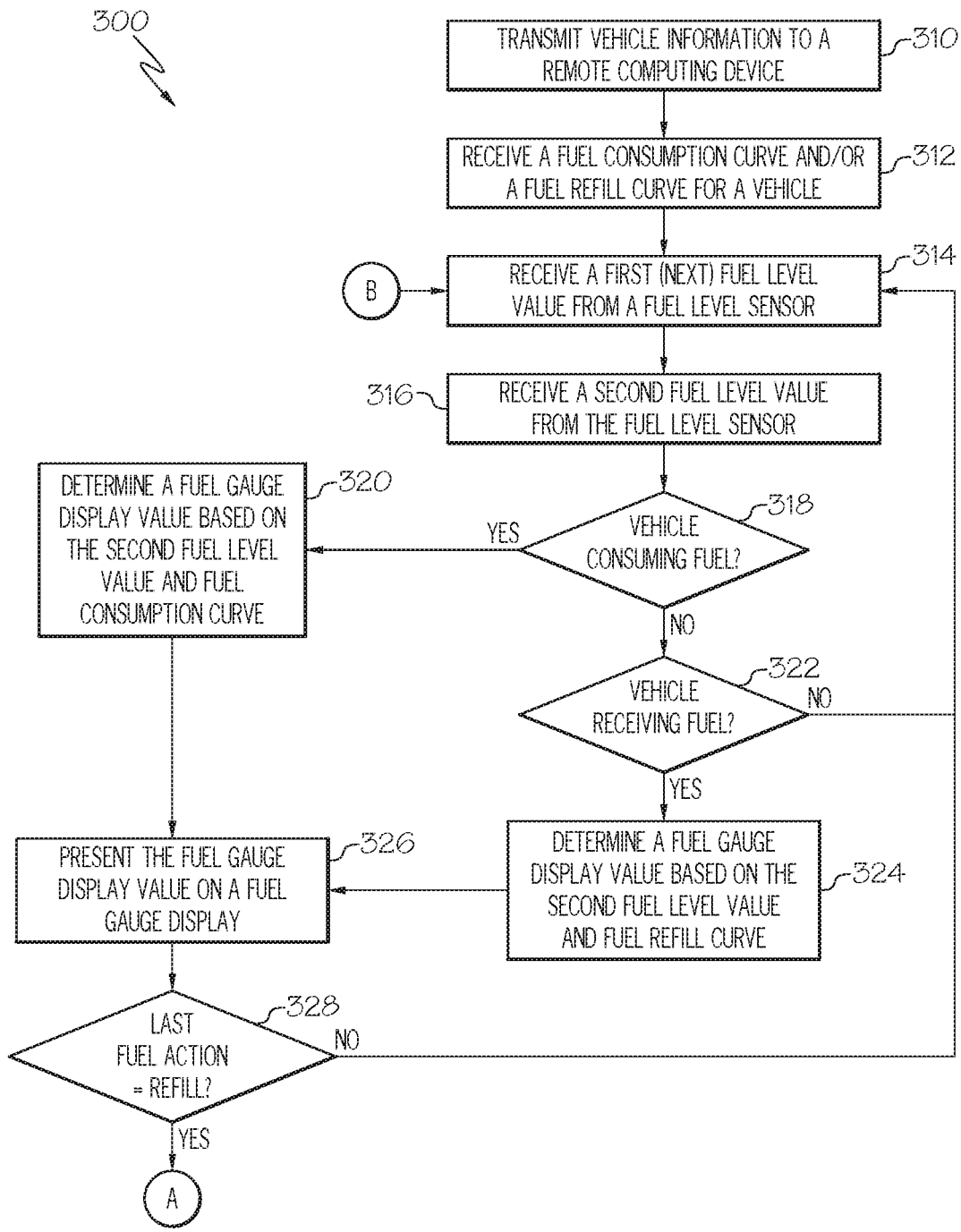
FIG. 3A depicts an illustrative flow diagram for reporting the fuel level in the fuel tank of the vehicle according to one or more embodiments shown and described herein.
Figure 3B:
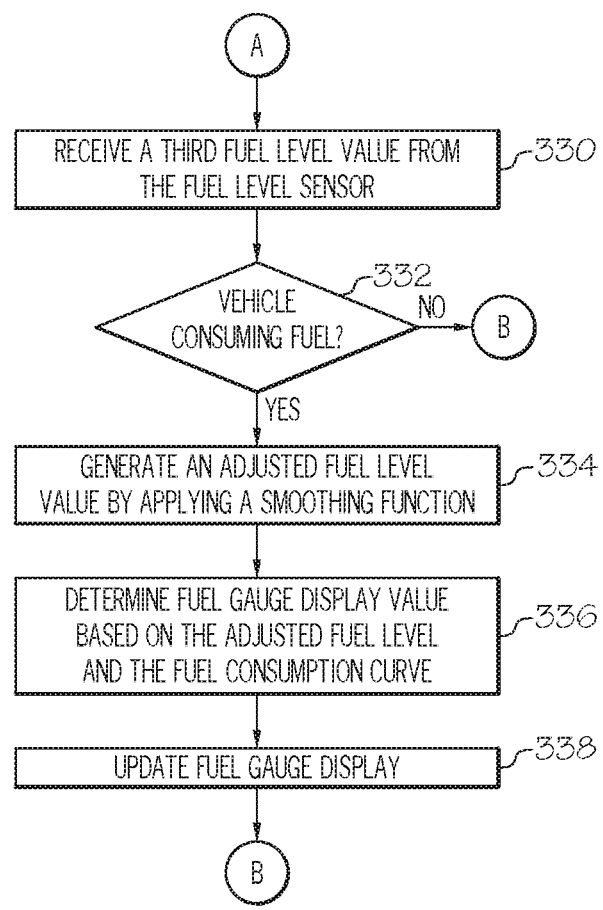
FIG. 3B depicts a continuation of the illustrative flow diagram of FIG. 3A for reporting the fuel level in the fuel tank of the vehicle according to one or more embodiments shown and described herein.

Methods implemented by the electronic control unit 105 of the vehicle 104 will now be described in detail with respect to the flow diagrams depicted in FIGS. 3A and 3B. FIGS. 3A and 3B depict a flow diagram 300 of a method for determining and reporting a fuel level in a fuel tank 106 (FIG. 1) of a vehicle 104 (FIG. 1). The method depicted in the flow diagram 300 may be implemented by the electronic control unit 105 (FIGS. 1 and 2) of the vehicle 104 and/or other components of the system described herein. However, for purposes of description and simplification the method will be described with reference to the electronic control unit 105 (FIGS. 1 and 2) of the vehicle 104. In some embodiments, at block 310, the electronic control unit 105 may transmit vehicle information about the vehicle 104 to a remote computing device. In some embodiments, the vehicle information includes a vehicle identifier, such as a vehicle identification number (VIN), an indication of the vehicle make and model, or some other indicator that may be used to map the vehicle information to a particular vehicle for which a fuel refill curve and/or fuel consumption curve have been determined. The remote computing device may receive the information and query its database stored therein for a fuel consumption curve and/or a fuel refill curve associated with the vehicle information. At block 312, the electronic control unit 105 may receive the fuel consumption curve and/or the fuel refill curve associated with the vehicle information. In some embodiments, the electronic control unit 105 may query, and in response receive a fuel consumption curve and/or a fuel refill curve associated with the vehicle 104, from a data storage component 236 (FIG. 2). In some instances, the electronic control unit 105 may transmit the vehicle information to a remote computing device to determine and/or obtain an update to the fuel consumption curve and/or the fuel refill curve.

At block 314, the electronic control unit 105 receives a first fuel level value (e.g., via the local interface 246, which may include a controller area network in some embodiments) from a fuel level sensor (e.g., the fuel level sensor 270). At block 316, the electronic control unit 105 receives a second fuel level value (e.g., via the local interface 246, which may include a controller area network in some embodiments) from the fuel level sensor (e.g., the fuel level sensor 270). At block 318, the electronic control unit 105 determines whether the vehicle 104 is consuming fuel. This determination may be accomplished by comparing the first fuel level value received at block 314 and the second fuel level value received at block 316. If a change from the first fuel level value to the second fuel level value indicates a decrease, then the electronic control unit 105 determines that the vehicle 104 is consuming fuel (YES determination at block 318). In response, the electronic control unit 105, proceeds to block 320 and determines a fuel gauge display value for an amount of fuel in the fuel tank 106 based on the second fuel level value and the fuel consumption curve. For example, a query of the fuel consumption curve may be executed whereby the second fuel level value is provided as an input to a fuel consumption function employing the fuel consumption curve and an amount of fuel remaining is returned, for example by mapping the input second fuel level value to the corresponding amount of fuel remaining utilizing the fuel consumption curve. The amount of fuel remaining defines the fuel gauge display value, which may be displayed on the fuel gauge display 260. In some embodiments, the fuel gauge display value may be an absolute value, such as the gallons remaining in the fuel tank 106 or a relative value such as a percentage of total possible fuel remaining. This may be preconfigured or user selected as an option of the vehicle 104.

Figure 4A:
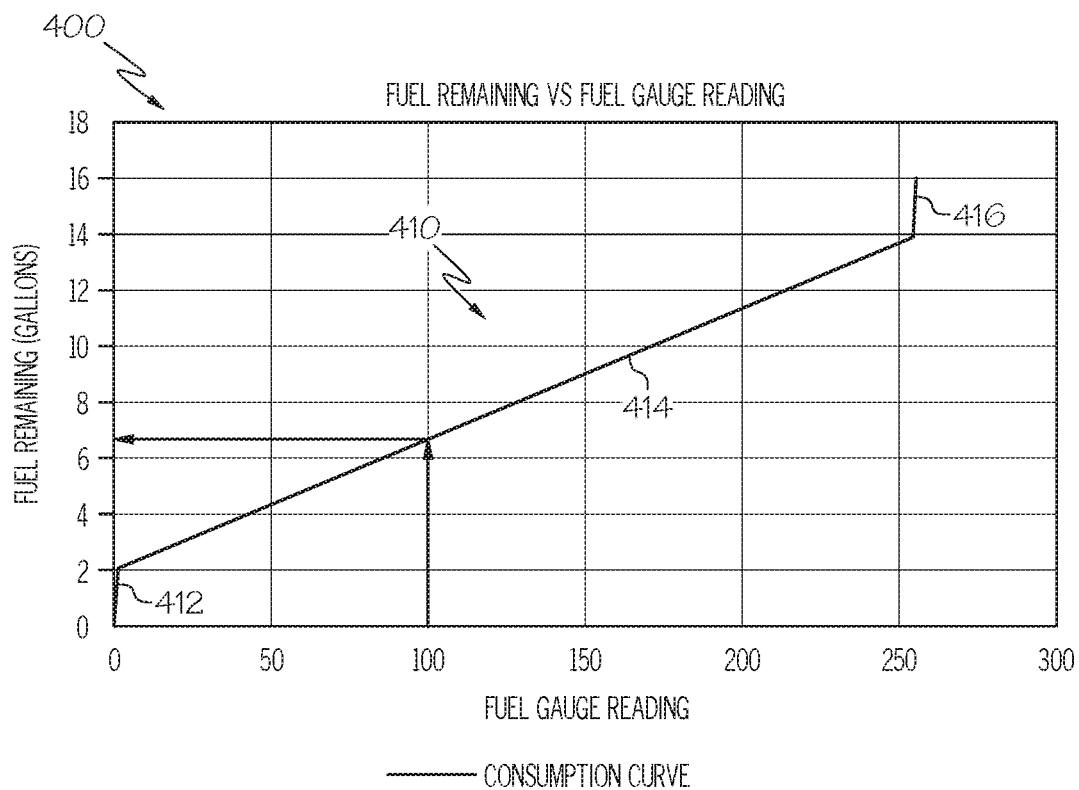
FIG. 4A depicts an example plot of a fuel consumption curve according to one or more embodiments shown and described herein.

Briefly referring to FIG. 4A, a plot 400 of a fuel consumption curve 410 is depicted. The fuel consumption curve may be stored in the memory component 240 (FIG. 2) or a data storage component 236 (FIG. 2) as a lookup table, data array, or the like. The system may utilize the fuel consumption curve or more specifically, the data represented by the curve to determine a fuel remaining value based on a fuel level value received from a fuel level sensor. The fuel level value may be a numerical value between 0-255 or other range depending on the systems implementation of the number data bits used for representing a sensor value provided by the fuel sensor 270. FIG. 4A, for example, depicts the case where a CAN value representative of a fuel gauge reading for a fuel level value is 100 and that the corresponding fuel remaining may be determined to be about 7 gallons based on the fuel consumption curve 410. It is further noted that the fuel consumption curve 410 may not be a linear curve from empty to full. For example, in some embodiments, the fuel consumption curve 410 may include one or more portions 412, 414, and 416 where each define different relationships between a fuel gauge reading and fuel remaining between an empty and full tank. In some embodiments, the fuel consumption curve 410 may be defined by a polynomial function or other mathematic function defining the characterized relationship between a CAN fuel sensor reading and the actual amount of fuel remaining in a fuel tank 106 of a vehicle 104.

Referring back to FIG. 3, if the electronic control unit 105 determines that the vehicle 104 is not consuming fuel (NO determination at block 318), at block 322, the electronic control unit 105 determines whether the vehicle 104 is receiving fuel. This determination may be accomplished by comparing the first fuel level value received at block 314 and the second fuel level value received at block 316. If a change from the first fuel level value to the second fuel level value indicates an increase, then the electronic control unit 105 determines that the vehicle 104 is receiving fuel (YES determination at block 322). In response, the electronic control unit 105, proceeds to block 324 and determines a fuel gauge display value for an amount of fuel in the fuel tank 106 based on the second fuel level value and the fuel refill curve. For example, a query of the fuel refill curve may be executed whereby the second fuel level value is provided as an input to a fuel refill function employing the fuel refill curve and an amount of fuel remaining is returned, for example by mapping the input second fuel level value to the corresponding amount of fuel remaining utilizing the fuel refill curve. The amount of fuel remaining defines the fuel gauge display value, which may be displayed on the fuel gauge display 260. In some embodiments, the fuel gauge display value may be an absolute values such as the gallons remaining in the fuel tank 106 or a relative value such as a percentage of total possible fuel remaining. Again, this may be preconfigured or user selected as an option of the vehicle 104.

Figure 5A:
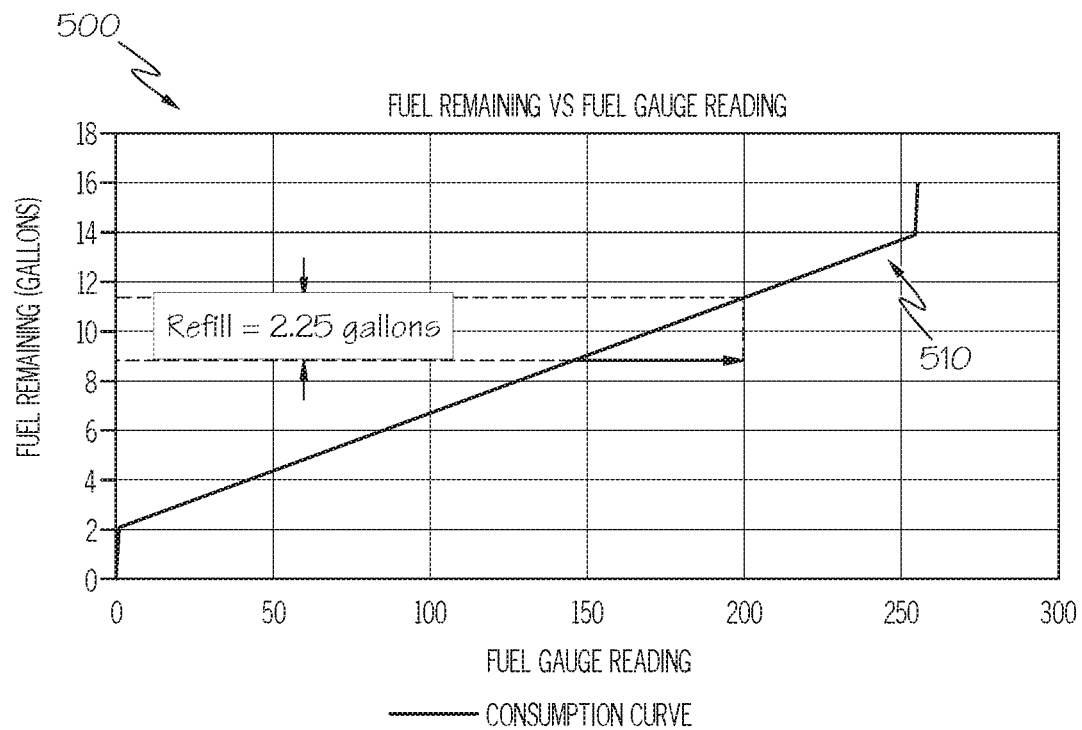
FIG. 5A depicts an example plot of a fuel consumption curve being used to determine a fuel refill amount according to one or more embodiments shown and described herein.
Figure 5B:
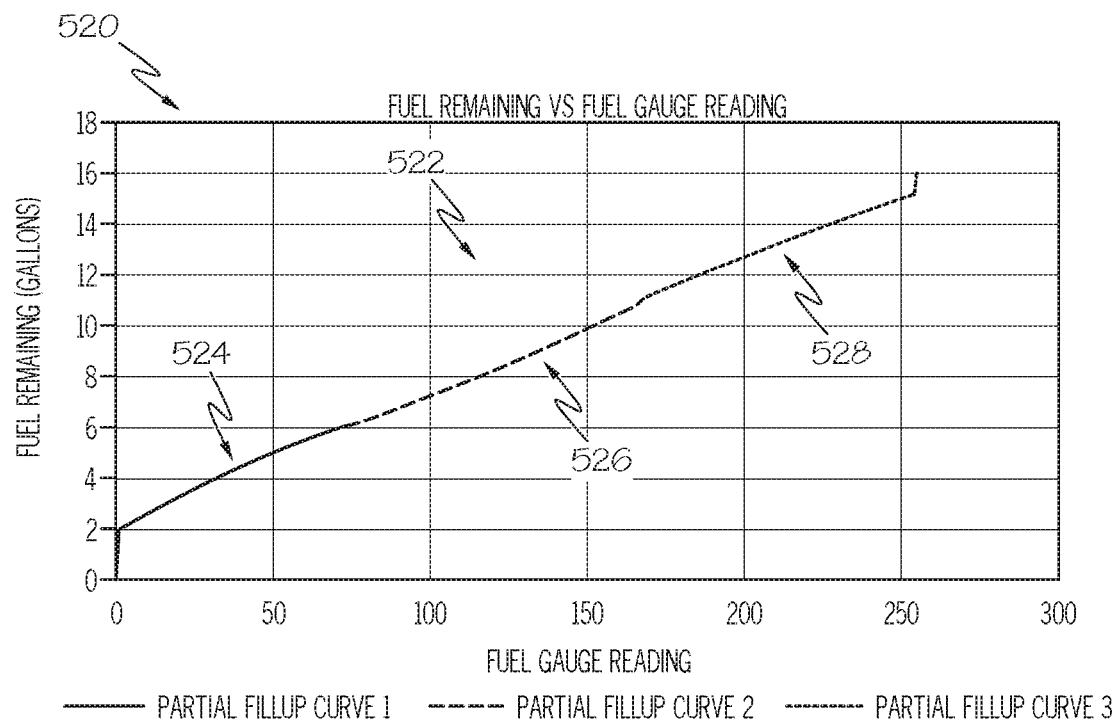
FIG. 5B depicts an example plot of a fuel refill curve comprising three partial refill curves according to one or more embodiments shown and described herein.

Briefly referring to FIGS. 5A-5C an understanding of the partial refill problem and solution may be obtained. FIGS.

5A-5C depict example charts 500 (FIG. 5A), 520 (FIG. 5B), and 530 (FIG. 5C) an amount of fuel remaining in the fuel tank (also referred to as the "fuel remaining") versus a CAN bus (e.g., a 0-255 value based on an output from the fuel sensor 270) fuel level value (also referred to as a "fuel gauge reading"). As depicted in FIG. 5A, if a tank receives fuel such that the fuel gauge reading increases from 150 to 200, by using the fuel consumption curve 510, 2.25 gallons are assumed to have been received by the tank. However, this is not correct because 3.5 gallons were input into the fuel tank. In view of this observation, a fuel refill curve 522 may be generated through a series of drain and refill tests at various stages of refilling (e.g., 0-10%, 10%-20%, 20%-30%, and so on). The fuel refill curve 522 may be defined by one or more partial refill curves 524, 526, and 528 as depicted in FIG. 5B. Referring to FIG. 5C, by utilizing the fuel refill curve 522 now a 3.5 gallon input to the fuel tank, which is registered as a change from 150 to 200 on the fuel gauge reading on the CAN bus, is accurately determined utilizing the fuel refill curve.

Referring back to FIG. 3, should the first fuel level value and the second fuel level value be the same (e.g., by determining NO at blocks 318 and 322), the electronic control unit 105 may return to blocks 314 and 316 and receive a new set of first and second fuel level values from the fuel level sensor (e.g., the fuel level sensor 270). Receipt of the first fuel level value and receipt of the second fuel level value are separated from each other by a predefined period of time such that a consumption or refilling event may be determined. At block 326, the electronic control unit 105 presents the fuel gauge display value determined at block 320 or block 324 on a fuel gauge display (e.g., the fuel gauge display 260 of FIG. 2).

In some embodiments, the electronic control unit 105, at block 328, then determines whether the last action was a refill. For example, the electronic control unit 105 may determine whether the fuel gauge display (e.g., the fuel gauge display 260 of FIG. 2) was last updated as a result of a refill action. In the event that the last fuel action was not a refill action (e.g., the last fuel action is determined to be a fuel consumption event) (NO at block 328), the electronic control unit 105 returns to block 314. However, if the last fuel action was a fuel refill event (YES at block 328), the electronic control unit 105 proceeds to block 330. At block 330, the electronic control unit 105 may receive a third fuel level value (e.g., via the local interface 246, which may include a controller area network in some embodiments) from the fuel level sensor (e.g., the fuel level sensor 270). At block 332, the electronic control unit 105 determines whether the vehicle 104 is consuming fuel. This determination may be accomplished by comparing the third fuel level value received at block 330 and the second fuel level value received at block 316. If a change from the second fuel level value to the third fuel level value indicates a decrease, then the electronic control unit 105 determines that the vehicle 104 is consuming fuel (YES at block 332). In response, the electronic control unit 105, at block 334, generates an adjusted fuel level value by implementing a smoothing function to each subsequent consumption fuel level value obtained from the fuel level sensor. An adjusted fuel level value is computed using the smoothing function for each subsequent consumption fuel level value obtained from the fuel level sensor until one of the subsequent consumption fuel level values intersects a fuel level value on the fuel consumption curve. In other words, since the fuel refill curve and the fuel consumption curve do not necessarily overlap there is a need in some instances to implement a function that drives the fuel gauge display values back to the fuel consumption curve over a period of time.

Turning briefly to FIG. 6, the smoothing function and implementation thereof will be described. FIG. 6 depicts an illustrative plot 600 of a fuel consumption curve 610 and a fuel refill curve 612 including three partial refill curves. The plot 600 includes fuel remaining values along the vertical axis and fuel gauge readings along the horizontal axis.

depicts an illustrative plot of a fuel consumption curve and a fuel refill curve including three partial refill curves Since the fuel refill curve 612 and the fuel consumption curve 610 do not necessarily track each other, a smoothing function may be implemented which is configured to bring the fuel level measurements back into agreement with the consumption curve from the refill curve over a period of time. For example, after a partial refill, if the final gauge reading (aka, the current fuel level value obtained from the fuel level sensor) is <200, it may take about 8% of the final gauge reading to come back to the consumption scale. If the final gauge reading is >200, then it may take about 10% of the final gauge reading to come back to the consumption scale. A weighted average technique may be utilized to calculate the fuel remaining using both the scales. A formula for the weighted average is as follows:

Current Gauge Reading—"CGR" refers to the current fuel level value obtained from the fuel level sensor, for example, following the method presently described, CGR would be the third fuel level value.

Percentage value—"PV" (e.g., 5%, 6%, 7%, 8%, 9%, or 10%) as determined by the user or as a predetermined characteristic based on the relationship between the fuel refill curve and the fuel consumption curve across the range of fuel level values obtainable from the fuel level sensor.

Peak Gauge Reading post the partial refill—"PGR" refers to the fuel level value obtained once the partial refill is complete, for example, following the method presently described, CGR would be the second fuel level value.

Fill-up Scale Value—"FSV" refers to the amount of fuel remaining also referred to as the fuel remaining (e.g., gallons, values on the vertical axis with respect to FIG. 6). That is, it is the fuel remaining value that corresponds to the fuel refill curve and a fuel level value such as the CGR, the third fuel level value.

Consumption Scale Value—"CSV" refers to the amount of fuel remaining also referred to as the fuel remaining (e.g., gallons) with respect to FIG. 6. That is, it is the fuel remaining value that corresponds to the fuel consumption curve and a fuel level value such as the CGR, the third fuel level value.

Lower Limit=Round(PGR(1−PV))

Fill-up scale factor=(CGR−Lower Limit)/(PGR−Lower Limit)

Consumption scale factor=(PGR−CGR)/(PGR−Lower Limit)

Fuel Remaining (e.g., fuel gauge display value)=Fill-up scale factor*Fill-up scale value at CGR+Consumption scale factor*Consumption scale value at CGR, which may be written as the following Equation (1):

$$\text{fuel gauge display value} = \frac{CGR - (\text{Round}(PR(1-PV)))}{PGR - (\text{Round}(PR(1-PV)))} * FSV_{CGR} + \frac{PGR - CGR}{PGR - (\text{Round}(PR(1-PV)))} * CSV_{CGR}.$$

The smoothing function may be implemented until the adjusted fuel level value and the fuel level value produce the same result with respect to the fuel consumption curve.

Referring back to FIG. 3, the electronic control unit 105, at block 336, determines a new fuel gauge display value based on the adjusted fuel level and the fuel consumption curve. The electronic control unit 105, then, at block 338, may update the fuel gauge display with the fuel gauge display value based on the adjusted fuel level value and the fuel consumption curve.

It should be understood that steps of the aforementioned process may be omitted or performed in a variety of orders while still achieving the object of the present disclosure. The functional blocks and/or flowchart elements described herein may be translated onto machine-readable instructions. As non-limiting examples, the machine-readable instructions may be written using any programming protocol, such as: descriptive text to be parsed (e.g., such as hypertext markup language, extensible markup language, etc.), (ii) assembly language, (iii) object code generated from source code by a compiler, (iv) source code written using syntax from any suitable programming language for execution by an interpreter, (v) source code for compilation and execution by a just-in-time compiler, etc. Alternatively, the machine-readable instructions may be written in a hardware description language (HDL), such as logic implemented via either a field programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components.

The following will now discuss some background with respect to characterizing a vehicle's fuel consumption and fuel refill responses in developing accurate fuel consumption curves and/or fuel refill curves. Referring again briefly to FIG. 4A, the example fuel consumption curve was constructed, for example, through the steps of data pre-processing and fuel consumption distribution analysis. During data pre-processing, data cleansing of numerous driving event trips was done and clean data was used for the mapping table creation. For example, data cleansing may include: 1) dropping the fuel gauge readings from trip start and trip ends, 2) dropping fuel gauge readings prior and after a data loss event (due to missing data), and 3) dropping fuel gauge reading fluctuations due to fuel refill and uphill or downhill driving. The fuel consumption distribution analysis included statistical analysis utilizing statistical parameters such as mean, median, standard deviation, quartiles, upper whisker and the like for each reading.

Figure 4B:
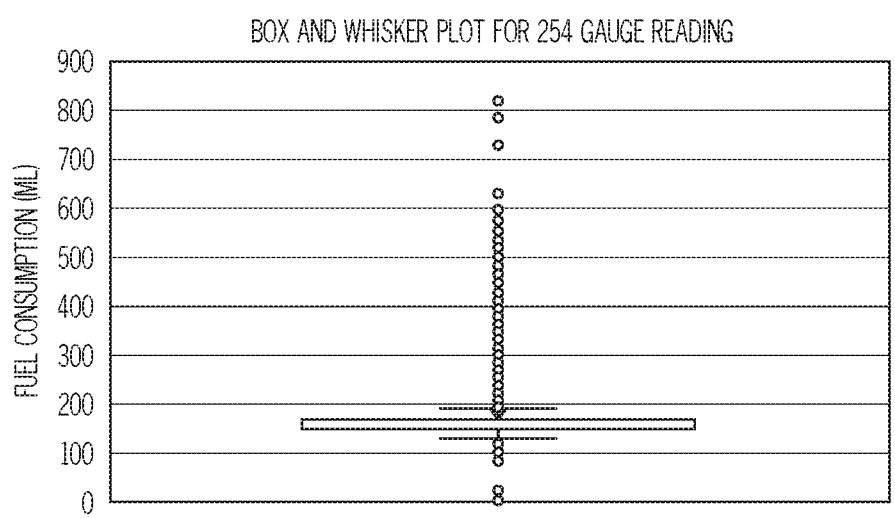
FIG. 4B depicts a box and whisker plot for fuel gauge reading according to one or more embodiments shown and described herein.

A box and whisker plot for fuel gauge reading 254 is depicted in FIG. 4B. For the fuel gauge readings from 1 to 254, the upper whisker for a respective reading was considered as the fuel consumption value for that particular reading. The average inter quartile ranges and standard deviations for these distributions was about 19 ml and 29 ml respectively. For the fuel gauge reading 255 the standard deviation and the inter quartile range was about 2000 ml. The reason for this value could be due to incomplete filling of the fuel tank, overfilling the tank, and sensor fluctuations. Since the central tendency of this skewed distribution is given by the median, the median value was considered as the fuel consumption value for the 255 gauge reading.

Turning to the fill-up and partial refill curve construction, in order to identify the partial refills, drain and refill tests were conducted to generate a refill curve along with the consumption curve. In order to fit the refill/fill-up curve with an R square value of close to 0.99, a piece-wise 4th order polynomial function was used. A final mapping table along with the validation tests results were generated. During any partial refill event after consumption, the final fuel remaining may be calculated using the fill-up table. If it is a back to back partial refill then the second refill will trace the fill-up curve and so on.

It should be understood that systems and methods described herein relate to improving the accuracy in reporting the fuel level in a fuel tank. In some embodiments, a method of reporting the fuel level in a fuel tank of a vehicle includes receiving, at an electronic control unit, a fuel consumption curve and a fuel refill curve for a vehicle; receiving, at the electronic control unit, a first fuel level value over a controller area network from a fuel level sensor; receiving, at the electronic control unit, a second fuel level value over a controller area network from a fuel level sensor; and determining whether the vehicle is consuming fuel or receiving fuel based on a change between the first fuel level value and the second fuel level value. In response to determining that the vehicle is consuming fuel, the electronic control unit may determine a fuel gauge display value for an amount of fuel in a fuel tank based on the second fuel level value and the fuel consumption curve. In response to determining that the vehicle is receiving fuel, the electronic control unit may determine a fuel gauge display value for an amount of fuel in a fuel tank based on the second fuel level value and the fuel refill curve. Furthermore, the method includes presenting the fuel gauge display value on a fuel gauge display.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method of reporting a fuel level in a fuel tank of a vehicle, the method comprising:
   receiving, at an electronic control unit, a fuel consumption curve and a fuel refill curve;
   receiving, at the electronic control unit, a first fuel level value from a fuel level sensor;
   receiving, at the electronic control unit, a second fuel level value from the fuel level sensor;
   determining whether the vehicle is consuming fuel or receiving fuel based on a change between the first fuel level value and the second fuel level value;
   in response to determining that the vehicle is consuming fuel, determining a fuel gauge display value for an amount of fuel in a fuel tank based on the second fuel level value and the fuel consumption curve;
   in response to determining that the vehicle is receiving fuel, determining the fuel gauge display value for the amount of fuel in the fuel tank based on the second fuel level value and the fuel refill curve; and presenting the fuel gauge display value on a fuel gauge display.

2. The method of claim 1, further comprising:

transmitting vehicle information to a remote computing device; and receiving, from the remote computing device, at least one of the fuel consumption curve or the fuel refill curve for the vehicle associated with the vehicle information.

3. The method of claim 1, further comprising:

in response to determining that the vehicle received fuel:
receiving, at the electronic control unit, a third fuel level value from the fuel level sensor;
determining that the vehicle is consuming fuel based on a change between the third fuel level value and the second fuel level value;
in response to determining that the vehicle is consuming fuel, generating an adjusted fuel level value by implementing a smoothing function to each subsequent consumption fuel level value obtained from the fuel level sensor; and
determining the fuel gauge display value for the amount of fuel in the fuel tank based on the adjusted fuel level value and the fuel consumption curve.

4. The method of claim 3, wherein the smoothing function utilizes a weighted average technique defined by:

$$\text{fuel gauge display value} = \frac{CGR - (\text{Round}(PR(1-PV)))}{PGR - (\text{Round}(PR(1-PV)))} * FSV_{CGR} + \frac{PGR - CGR}{PGR - (\text{Round}(PR(1-PV)))} * CSV_{CGR},$$

wherein CGR is a current fuel level value from the fuel level sensor, PGR is a fuel level value obtained once a partial refill event is complete, PV is a predetermined percent value, $FSV_{CGR}$ is a fill-up scale value corresponding to the CGR and the fuel refill curve, and $CSV_{CGR}$ is a consumption scale value corresponding to the CGR and the fuel consumption curve.

5. The method of claim 4, wherein PV is a value from 5% to 10%.

6. The method of claim 1, wherein the fuel consumption curve is a non-linear curve.

7. The method of claim 1, wherein the fuel refill curve is a non-linear curve.

8. The method of claim 1, wherein the fuel refill curve includes two or more piecewise partial refill curves.

9. A system of reporting a fuel level in a fuel tank of a vehicle comprising:

a fuel gauge display;
a fuel level sensor; and
an electronic control unit communicatively coupled to the fuel gauge display and the fuel level sensor, wherein the electronic control unit is configured to:
receive a fuel consumption curve and a fuel refill curve;
receive a first fuel level value from the fuel level sensor;
receive a second fuel level value from the fuel level sensor;
determine whether the vehicle is consuming fuel or receiving fuel based on a change between the first fuel level value and the second fuel level value;
in response to determining that the vehicle is consuming fuel, determine a fuel gauge display value for an amount of fuel in a fuel tank based on the second fuel level value and the fuel consumption curve;
in response to determining that the vehicle is receiving fuel, determine the fuel gauge display value for the amount of fuel in the fuel tank based on the second fuel level value and the fuel refill curve; and
present the fuel gauge display value on the fuel gauge display.

10. The system of claim 9, wherein the electronic control unit is further configured to:

transmit vehicle information to a remote computing device; and receive, from the remote computing device, at least one of the fuel consumption curve or the fuel refill curve for the vehicle associated with the vehicle information.

11. The system of claim 9, wherein the electronic control unit is further configured to:

in response to determining that the vehicle received fuel:
receive a third fuel level value from the fuel level sensor;
determine that the vehicle is consuming fuel based on a change between the third fuel level value and the second fuel level value;
in response to determining that the vehicle is consuming fuel, generate an adjusted fuel level value by implementing a smoothing function to each subsequent consumption fuel level value obtained from the fuel level sensor; and
determine the fuel gauge display value for the amount of fuel in the fuel tank based on the adjusted fuel level value and the fuel consumption curve.

12. The system of claim 11, wherein the smoothing function utilizes a weighted average technique defined by:

$$\text{fuel gauge display value} = \frac{CGR - (\text{Round}(PR(1-PV)))}{PGR - (\text{Round}(PR(1-PV)))} * FSV_{CGR} + \frac{PGR - CGR}{PGR - (\text{Round}(PR(1-PV)))} * CSV_{CGR},$$

wherein CGR is a current fuel level value from the fuel level sensor, PGR is a fuel level value obtained once a partial refill event is complete, PV is a predetermined percent value, $FSV_{CGR}$ is a fill-up scale value corresponding to the CGR and the fuel refill curve, and $CSV_{CGR}$ is a consumption scale value corresponding to the CGR and the fuel consumption curve.

13. The system of claim 12, wherein PV is a value from 5% to 10%.

14. The system of claim 9, wherein the fuel consumption curve is a non-linear curve.

15. The system of claim 9, wherein the fuel refill curve is a non-linear curve.

16. The system of claim 9, wherein the fuel refill curve includes two or more piecewise partial refill curves.

17. A vehicle comprising:

a fuel gauge display;
a fuel level sensor; and
an electronic control unit communicatively coupled to the fuel gauge display and the fuel level sensor, wherein the electronic control unit is configured to:
receive a fuel consumption curve and a fuel refill curve;
receive a first fuel level value from the fuel level sensor;
receive a second fuel level value from the fuel level sensor;

determine whether the vehicle is consuming fuel or receiving fuel based on a change between the first fuel level value and the second fuel level value;

in response to determining that the vehicle is consuming fuel, determine a fuel gauge display value for an amount of fuel in a fuel tank based on the second fuel level value and the fuel consumption curve;

in response to determining that the vehicle is receiving fuel, determine the fuel gauge display value for the amount of fuel in the fuel tank based on the second fuel level value and the fuel refill curve; and present the fuel gauge display value on the fuel gauge display.

18. The vehicle of claim 17, wherein the electronic control unit is further configured to:

transmit vehicle information to a remote computing device; and receive, from the remote computing device, at least one of the fuel consumption curve or the fuel refill curve for the vehicle associated with the vehicle information.

19. The vehicle of claim 17, wherein the electronic control unit is further configured to:

in response to determining that the vehicle received fuel:

receive a third fuel level value from the fuel level sensor;

determine that the vehicle is consuming fuel based on a change between the third fuel level value and the second fuel level value;

in response to determining that the vehicle is consuming fuel, generate an adjusted fuel level value by implementing a smoothing function to each subsequent consumption fuel level value obtained from the fuel level sensor; and determine the fuel gauge display value for the amount of fuel in the fuel tank based on the adjusted fuel level value and the fuel consumption curve.

20. The vehicle of claim 19, wherein the smoothing function utilizes a weighted average technique defined by:

$$\text{fuel gauge display value} = \frac{CGR - (\text{Round}(PR(1-PV)))}{PGR - (\text{Round}(PR(1-PV)))} * FSV_{CGR} + \frac{PGR - CGR}{PGR - (\text{Round}(PR(1-PV)))} * CSV_{CGR},$$

wherein CGR is a current fuel level value from the fuel level sensor, PGR is a fuel level value obtained once a partial refill event is complete, PV is a predetermined percent value, $FSV_{CGR}$ is a fill-up scale value corresponding to the CGR and the fuel refill curve, and $CSV_{CGR}$ is a consumption scale value corresponding to the CGR and the fuel consumption curve.

* * * * *